Oct. 12, 1965 H. H. ADELAAR ETAL 3,211,839

TIME DIVISION MULTIPLEX SIGNALLING SYSTEM

Filed July 24, 1961

Inventor
H. ADELAAR
F. CLEMENS
J. MASURE
By [signature]
Attorney

United States Patent Office 3,211,839

Patented Oct. 12, 1965

3,211,839

TIME DIVISION MULTIPLEX SIGNALLING SYSTEM

Hans Helmut Adelaar, Frans Clemens, and Jean Louis Masure, all of Antwerp, Belgium, assignors to International Standard Electric Corporation, New York, N.Y., a corporation of Delaware Filed July 24, 1961, Ser. No. 126,334
Claims priority, application Belgium, Aug. 9, 1960, 29,980, Patent 593,910
6 Claims. (Cl. 179—84)

The invention relates to a signalling system using one or more frequency generators and particularly voice frequency generators to transmit information on a given link in a communication system. For a disclosure of one such system reference may be had to U.S. Patent No. 2,910,540.

Such systems are well known. They are used in particular in telecomunication systems and particularly in telephone exchanges for the transmission of information from one exchange to another, e.g. in the case of a multi-frequency system, in the manner described in the Belgian Patent No. 586,689 (J. Martens). Such signalling systems may equally well be used between subscribers and telephone exchanges and particularly the telephone exchange to which the subscriber is connected.

In all these systems, the voice frequency receivers and oscillators (except the oscillators in the subscriber sets used to signal toward the telephone exchange, e.g. to send the number of the called subscriber), are in general part of a register circuit which controls the establishment of the communication. A sufficient number of such registers is provided in each exchange for the traffic of this exchange. One of the principal functions of these registers is to establish the communication in response to signals identifying the called subscriber.

In TDM electronic communication systems, the voice links are replaced by multiplex highways using the principle of sending samples of conversations by means of time division multiplexing. It may be advantageous either to use a single multiple register for the whole exchange, or at least to reduced number of multiple registers. These multiple registers are essentially constituted by a temporary sequential access store which is associated with a device for staticising the information contained in the memory. Logical circuits, principally comprising electronic gates, are associated with the staticizing device in order to modify the staticised information before its re-recording in the memory.

The sequential access memory will in general be realized in the form of a coordinate memory such as a ferrite memory where the binary or bistate elements of the memory are constituted by cores with a substantially rectangular hysteresis characteristic. Such a coordinate memory contains a number of rows equal to the number of individual registers which are necessary to simultaneously handle the establishment of all new communications which could occur during a given time interval. This number is, of course, a function of the traffic. The number of columns corresponds to the number of binary digits which are required to register the establishment of each communication. With the help of an access switch, all the rows of the coordinate memory are successively authorized (e.g. by sending a pulse). The register of the authorized row or the corresponding compartment are read since on the column wires, pulses will appear or not appear in accordance with the information stored in the row.

Bistable trigger circuits associated with the column wires constitute the staticizing devices of the coordinate memory. These circuits register the information pertaining to a particular communication being established. During the staticizing time, the information will be used to accomplish a step in the establishment of the communication. At the end of the staticizing time it will be restored in the memory after eventually having been modified by the logical circuit of the register and in function of information received from other circuits. At the next cycle, and during the same staticizing time, the eventually modified information may give rise to other controls for the establishment of the communication. This process may be repeated for each communication being established, in accordance with a pre-established operating programme, time division multiplexing being thus also used for the registers.

With the help of such a multiple register, each individual register consists essentially of a compartment of coordinate memory, in such a way that each individual register is essentially a memory registering various codes which are continually modified up to the establishment of the communication. Thus it is no longer possible with such a system to conceive voice frequency receivers and generators which make part of the register.

A general object of the invention is to realize a signalling system, particularly a voice frequency signalling system which is particularly adapted to electronic communication systems using highways working in accordance with the time division multiplex principle, and in the control equipment for such multiplex highways, using registers which also work in accordance with the time division multiplex principle.

Such systems have been described for instance in the copending U.S. applications S.N. 63,203, filed October 17, 1960 (H. Adelaar) and S.N. 74,434, filed December 7, 1960 (H. Adelaar et al.).

In accordance with a first characteristic of the invention, a signalling system as defined at the beginning of the description is characterised by the fact that signalling frequency generators are associated either individually, or by groups of generators, with one or more highways used in accordance with the time division multiplex principle; this association being particularly realized with the help of gates individual to each generator or to each group of generators, in the same manner as the other circuits such as the voice frequency line circuits, are associated with time division multiplex highways.

In accordance with another characteristic of the invention, in a system as characterized above, signalling receivers are also associated with time division multiplex highways in the same manner as the signalling generators, these receivers being also capable of association with the said highway singly through an individual gate, or else in groups, and also in groups comprising at least a signalling generator and a signalling receiver.

In accordance with yet another characteristic of the invention, the multiplex highways are associated with signalling frequency generators and/or receivers are connected to all the multiplex highways for the subscriber groups of the telephone exchanges.

In this manner, each subscriber may be connected through the multiplex highway serving his group and a multiplex highway of signaling units with the signalling frequency receiver or receivers included in these units. In this way, this receiver or receivers may be used to receive the identity of the called subscriber transmitted this time not by interruptions of the closed subscriber's loop as in conventional systems, but by voice frequency signals. For instance one may use the system described in the U.S. Patent No. 3,140,358, granted July 7, 1964 (J. Martens) which describes an arrangement wherein two transistor oscillators are foreseen in each subscriber subset so as to be able to characterize each digit constituting the number of the called subscriber by a combination of two predetermined frequencies out of a given number, e.g. 5. By using signalling units of five voice frequency receivers, each digit may thus be detected by these units.

Alternatively, as described in U.S. Patent No. 3,164,680, granted Januay 5, 1965 (H. Adelaar et al.) instead of using a push-button keyset to transmit the combination of two frequencies as described in the U.S. Patent 3,-140,385 (J. Martens), the usual dial may be kept but it will be used to interrupt or modify a signalling frequency transmitted by a transistor oscillator also provided in the subscriber's keyset. With such an arrangement signalling units may nevertheless be provided in the telephone exchange, which units will each comprise a given number of receivers tuned to a particular frequency, e.g. five receivers which are necessary when each digit is signalled by the simultaneous transmission of two frequencies out of five. If, in accordance with the above mentioned U.S. Patent 3,164,680, each dial pulse entailing the shifting from one to the other frequency of the oscillator at the subscriber's set, and if the transmitted digit will be detected by counting the number of transitions from one frequency to the other, just as D.C. pulses in the subscriber loop are detected, the choice of the two frequencies may nevertheless be influenced by other considerations. For each subscriber, the two frequencies controlled by the dial may for instance be chosen so as to characterize the class of the calling subscriber. The choice of the two particular frequencies may also serve for priority calls or yet in a general manner to identify any particular criterion produced by the calling subscriber, e.g. identification of the value of a coin introduced in a coin box slot.

It will be realized that with such a system it is no longer necessary that the register should be able to be connected to any line circuit so as to detect the interruptions of the subscriber's loop created by the operation of the dial. Voice frequency signals are transmitted on the multiplex network for conversational exchange and this will act upon tuned receivers in the signalling units. Thus it is only necessary for the register to be able to have access to these signalling units by control wires in order to detect the operation of the voice frequency receivers. The register must in any event have access to these units in order to be able to select one upon a new call.

But with this system, to detect the number of the called subscriber, the register needs only to have access to this number of signalling units which, being calculated in function of the number of communications to be simultaneously routed, is necessarily more reduced than the number of subscribers. In fact, the number of such signalling units may not only be smaller than the number of compartments in the supervision equipment, corresponding to the number of communications simultaneously established, but it may yet be smaller than the number of compartments of the multiple register since the busy time of the register is larger than the time taken for the actual signalling of the called subscriber's identity by the calling subscriber.

The signalling units may also comprise one or more voice frequency oscillators which will be able to transmit signals to the subscriber's set, e.g. those described in the U.S. Patent No. 3,164,680 (H. Adelaar et al.) Advantageously, such an oscillator may also be provided to send dial tone to the calling subscriber. As described in the U.S. Patent application S.N. 74,434, filed December 7, 1960 (H. Adelaar et al.) and U.S. patent application S.N. 125,238, filed July 19, 1961 (H. Adelaar et al.), in a telephone system using the time division multiplex principle, single signalling sources may be foreseen which by means of gates unblocked at the sampling rate of the signals may be connected to one or more multiplex highways serving subscriber groups and this during various time channels so as to transmit the signals emitted by these common signalling sources to the subscribers, e.g. ringing current, ringing tone, busy tone and dial tone. These tone transmissions may be interrupted by simply ceasing to unblock the gates connecting the subscriber highway either to the line circuit or to the signalling source, this unblocking of the gates at the sampling rate of the signals being as described in the above mentioned U.S. patent under the control of the supervision or register equipment.

However, in the case of the dial tone, the register which controls the interruptions of the subscriber's loop will also be able to cease unblocking the gates of the connection towards the dial tone source a certain time after having detected the first loop interruption following the operation of the dial. In the case of registers which are used in multiplex fashion as described above, a registered word being staticized only once during a cycle, this time may be relatively long particularly if as explained in the two above mentioned Belgian patents, the register and the supervision use a common access equipment towards the line circuits.

If signalling units are able to provide the dial tone individually to the calling subscriber, the register may have access much more rapidly to these units. It can, thus, put the corresponding oscillator out of operation after a delay following the detection of the first subscriber's loop interruption which will be sufficiently short so as to avoid any inconvenience to the calling subscriber.

The above objects and characteristics of the invention as well as others, will become more apparent and the invention itself will be better understood by referring to the following description of a detailed embodiment of the invention, this description to be read in conjunction with the accompanying drawing, in which.

Figure 1:
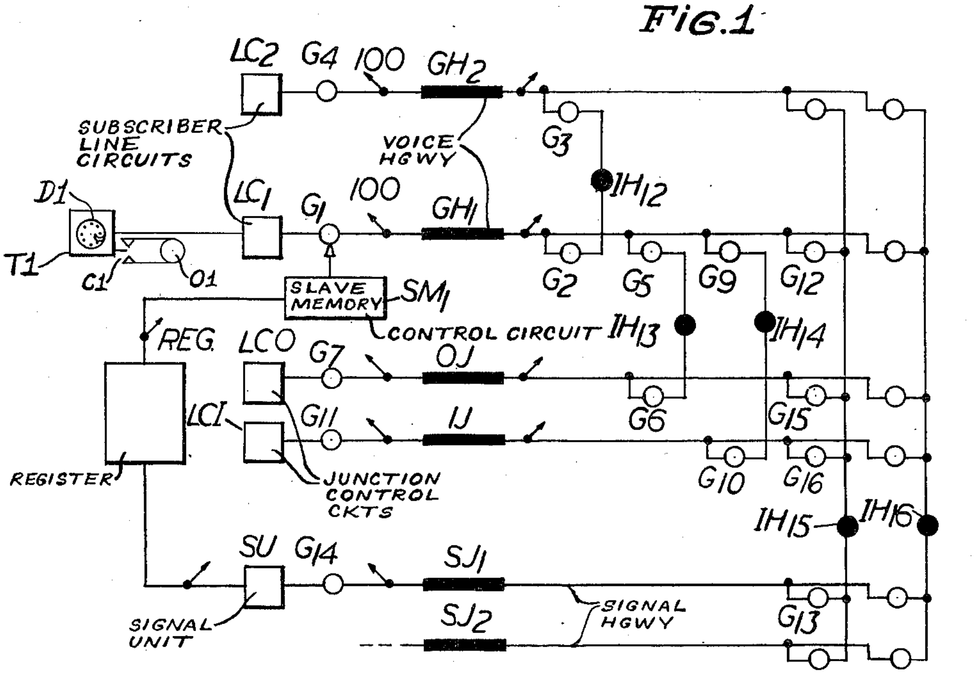
FIG. 1 is a trunking diagram showing a time division multiplexing system.
Figures 2, 3:
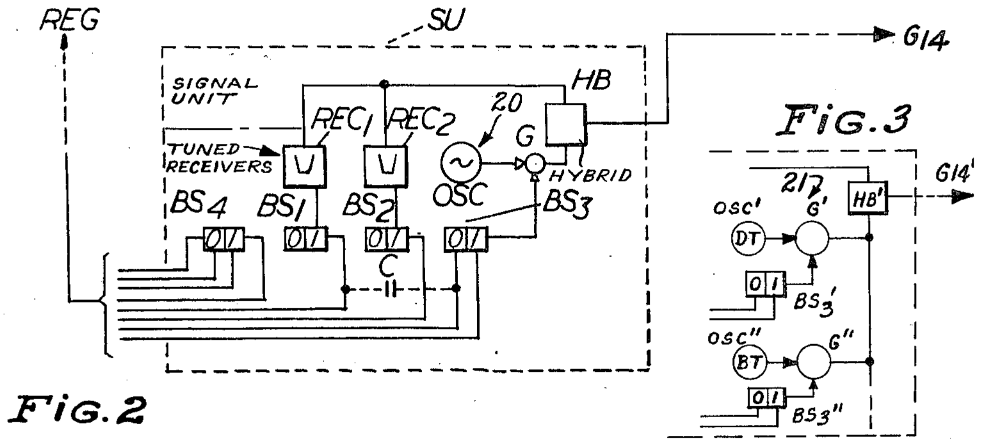
FIG. 2 is a signaling unit for use in the system of FIG. 1.

The FIGURE 1 schematically represents the junction diagram of a large telephone exchange such as a 10,000 line exchange. The arrangement is similar to that described in the copending U.S. application S.N. 63,203, (H. Adelaar). Each subscriber line circuit such as $LC_1$ is connected between the subscriber's line such as T1 and an electronic fate $G_1$ associated with this line circuit. The gate $G_1$ connects line circuit $LC_1$ to a multiplex highway $GH_1$ serving a group of such subscribers, e.g. 100, as indicated by the multipling arrow on the left of the highway $GH_1$. For a 10,000 line exchange, there may thus be in principle 100 multiplex highways such as $GH_1$. As indicated by the multipling arrow at the right of highway $GH_1$, the various subscriber group highways can be connected to intermediate highways such as $IH_{12}$ which connect any highway (such as $GH_1$ out of a group of such highways) either with another highway of the group or alternatively with any highway in another highway group. This connection is performed by gates analogous to $G_1$ (e.g. $G_2$ between $GH_1$ and $IH_{12}$, and $G_3$ between $IH_{12}$ and $GH_2$). The subscribers multiplex highways may be arranged in 10 supergroups of 1,000 subscribers which for local traffic needs of the exchange may be associated in pairs of two supergroups with the help of an intermediate highway such as $IH_{12}$ which will thus be provided with 20 gates to be able to connect it to any subscriber's highway of the two supergroups associated as a pair. Moreover, the $$\binom{5}{2}$$

combinations of two pairs of supergroups will be associated with an intermediate highway as $IH_{12}$, but which this time will have access to any of the 40 highways of the two pairs of supergroups. In this manner any subscriber may be connected to any other by passing through their group highways in series with an intermediate highway. As shown, the connection will thus comprise four gates in cascade such as $G_1$, $G_2$, $G_3$ and $G_4$ between the line circuits $LC_1$ and $LC_2$. Preferably, the communication should be bidirectional in accordance with the principle of resonant transfer circuits as described in U.S. Patent No. 3,073,903, (K. Cattermole et al.)

For the incoming and the outgoing traffic, incoming and outgoing multiplex highways may be used either to connect to voice frequency incoming and outgoing junctions, or to connect to any of the subscribers group of highways with the help of intermediate highways in the same manner as described above. One may for instance have 40 outgoing multiplex highways OJ arranged in four supergroups of 10 outgoing multiplex highways, and 40 intermediate multiplex highways will be used to interconnect any of the outgoing multiplex junction highways of the four supergroups with any of the subscribers multiplex highways pertaining to one of the ten supergroups. For the incoming junction multiplex highways such as IJ, an absolutely identical interconnection arrangement can be used.

Thus the figure indicates that the subscriber line circuit such as $LC_1$ can also be connected to the voice frequency circuit of an outgoing junction LCO through gate $G_1$, highway $H_1$, gate $G_5$, intermediate highway $IH_{13}$, gate $G_6$, outgoing multiplex highway OJ and gate $G_7$. A completely analogous connection may be established between the voice frequency circuit LCI of an incoming junction and the line circuit $LC_1$ in case of an incoming call. Connection from LCI to $LC_1$ will be extended through $G_{11}$, IJ, $G_{10}$, $IH_{14}$, $G_9$, $GH_1$ and $G_1$.

The supplementary multiplex highways $IH_{15}$ and $IH_{16}$ have access to all the subscribers group highways such as $GH_1$ and $GH_2$ and also to all the incoming or outgoing multiplex highways such as IJ or OJ. The subscriber group highway $GH_1$ for instance may be connected to the multiplex highway $IH_{15}$ through gate $G_{12}$. On the other hand, the intermediate multiplex highway $IH_{15}$ is connected to two signalling multiplex highways $SJ_1$ and $SJ_2$ through gates such as $G_{13}$ connected to the signalling highway $SJ_1$. As indicated on the figure, there are four gates such as $G_{13}$ permitting to interconnect one of the signalling highways $SJ_1$ and $SJ_2$ with one of the intermediate highways $IH_{15}$ and $IH_{16}$ specially reserved for signalling.

While the subscriber's group highways such as $GH_1$ have access to the line circuits of such subscribers, the signalling highways such as $SJ_1$ have access to the signalling units such as SU through gates such as $G_{14}$. These signalling units may comprise either a tuned receiver, or an oscillator emitting a particular voice frequency (as shown at 20), or a plurality of such receivers, or a plurality of such oscillators (as shown at 21), or yet any combination of receivers and oscillators in accordance with the aimed purpose.

All the gates represented in the figure such as $G_1$ are controlled by a slave control equipment such as $SM_1$ controlling all the gates associated with a multiplex highway, or at least all the gates associated with an end of such a multiplex highway. i.e. 100 gates on the subscriber's side in the case of $GH_1$. These slave control equipments essentially comprise delay lines which memorize the gate which must be unblocked during a given channel time. As described in the above U.S. patent applications S.N. 74,434, filed Dec. 7, 1960 (H. Adelaar et al.) and S.N. 125,238, filed July 19, 1961 (H. Adelaar et al.), the various slave control equipments are controlled by a master control equipment which may either have a register or a supervision function. In the present case, as it is concerned with signalling previous to the establishment of the communication, the connection between $SM_1$ and REG symbolizes the control exerted by the register REG on all the control systems serving the multiplex highway of which only the equipment $SM_1$ has been represented in the figure. On the other hand, the connection between the register REG and the signalling unit SU represented in the figure, symbolizes the exchange of information between the signalling units and the register.

As separately shown on the figure, a unit such as SU may comprise a tuned receiver $REC_1$ associated with a bistable trigger device $BS_1$ which normally stands in condition zero as long as the receiver does not receive the signalling frequency to which it is tuned. Device $BS_1$ goes over to condition one when $REC_1$ receives such a frequency. A second receiver $REC_2$ is identical to the first but is tuned to a second frequency. This receiver is used in association with a bistable $BS_2$ having a function identical to that of the bistable $BS_1$. Moreover, an oscillator OSC is also provided to generate a third frequency which for the example of signalling unit chosen here can be the dial tone while the other two frequencies on which $REC_1$ and $REC_2$ are repeatedly tuned, correspond to two possible frequencies for an oscillator O1 located at the subscriber set T1 and controlled by the dial D1 so that these frequencies are alternately emitted during the rotation of the dial. This oscillator OSC is associated with a third bistable $BS_3$ which, as indicated by gate G, renders the oscillator operative, i.e. causes it to apply its frequency to output wires. Finally, a fourth bistable $BS_4$ must be provided. This bistable does not necessarily exert a particular control on unit SU and may be located at any convenient place, but it serves to indicate to register REG the state of unit SU, i.e. when $BS_4$ is in its first condition zero it indicates to the register REG that the corresponding unit SU is free while it is marked as busy when $BS_4$ is in its condition one.

In this way, as soon as a call has been detected by any appropriate device (not shown) having access to the subscribers lines and after the selection of a free compartment in register REG, when the corresponding register word will be staticized by the sequential memory of the register, at a suitable time in the programme of the register, the logical circuit of the register will be able to control the selection of a free SU unit. The register REG has access to all these units SU as indicated by the multiplying arrow on the wire connecting the two circuits shown. The register can search for an idle register successively examining the state of the bistables $BS_4$ in order to determine a unit SU for which $BS_4$ is in its zero condition. This can be done by any appropriate scanning device.

In accordance with the duration of the staticizing time and the number of SU units, either a series or only one of these units may be successively examined during a given staticizing time. The register may put into memory, in the corresponding compartment, after the lapse of the staticizing time reserved to this compartment, that the selection of a free SU unit has not yet succeeded and that it must be pursued from the examination of a predetermined unit during the following staticizing time of the word contained in the said register compartment.

As soon as the register REG finds a free signalling unit SU, the register triggers $BS_4$ into condition one. Then, during other staticizing times (for the compartment of the register memory pertaining to the communication which is going to use SU for its establishment), the register will search for a time channel which is simultaneously free on the highway or junction on $GH_1$ of the calling subscriber, the highway or junction on $SJ_1$ of the unit SU and also the intermediate highway junction $IH_{15}$. This way the highway $IH_{15}$ interconnects the two highways having access to the voice frequency circuits. This determination of a simultaneously free time channel, i.e. the choice or the alignment of a channel, may be made following the system described in the U.S. Patent No. 3,158,689, granted November 28, 1964 (J. Masure). During yet other staticizing times, for the information relative to this communication, the register REG will transfer the indications necessary for the control equipment serving these three multiplex highways, such as $SM_1$ for $GH_1$, so that these equipments can control the corresponding gates, i.e. $G_1$, $G_{12}$, $G_{13}$ and $G_{14}$. During another staticizing time of the register word, the latter will then send a signal towards input 1 of bistable $BS_3$ in unit SU which has been selected. Of course, as soon as unit SU is seized, the register word contains in coded form the identity of the signalling unit SU so that this identity may serve to switch towards this particular SU unit the signal coming from the logical circuit of the register and which will cause the triggering of $BS_3$ into its condition 1.

From this moment, gate G of oscillator OSC is unblocked in such a way that the output of the oscillator is sent to gate $G_{14}$ connected to highway $SJ_1$ by passing through a transmission network HB. This network HB is assumed to comprise also the low pass filter and the resonant transfer elements. This gate $G_{14}$ like the gates $G_{13}$, $G_{12}$ and $G_1$ are regularly unblocked at the sampling rhythm of the speech transmission system, the oscillator OSC sends dial tone to the calling subscriber.

In return, the calling subscriber will now transmit the identity of the called subscriber with the help of his dial in accordance with the system described in U.S. Patent No. 3,164,680 (H. Adelaar et al.). From the moment the frequency to which $REC_1$ is tuned is emitted, its bistable $BS_1$ will be triggered into condition 1. On the other hand, when the first operation of the calling subscriber's dial (such as D1) contact C1 modifies the frequency of the oscillator O1 in the calling subscriber subset, the tuned receiver $REC_2$ will react and cause bistable $BS_2$ to be triggered into condition 1, $BS_1$ having been retriggered into condition 0 from the disappearance of the first frequency coming from the subscriber's set. Each time the dial impulse contact operates, $BS_1$ will thus be restored to zero while $BS_2$ will switch into condition 1 and vice versa. Hence, in this way, for each digit of the called subscriber a series of binary signals is obtained, the number of which identifies this digit.

Provided the staticizing rhythm of the various words contained in the corresponding compartments of the register sequential memory is sufficiently rapid, during each staticizing time of the word corresponding to the communication it is desired to establish, the register will examine the state of bistable $BS_1$ in unit SU with which it has become associated, so as to be able to successively count the number of pulses for each operation of the dial, this number being re-inscribed in the corresponding compartment of the register memory at the end of each staticizing period. In this way the register will progressively store the number of the called line and will serve to determine the connection between the calling and the called subscribers. As soon as the register has obtained complete information for the routing of the call, it will be able to send a signal towards unit SU with which it has become associated in order to reset bistable $BS_4$ into condition 0.

As soon as the first impulse is produced by the subscriber's dial, the register by examining the conditions of bistables $BS_1$ and $BS_2$ will be able to detect the sending of the pulses and hence will be able to send a signal to unit SU so as to reset bistable $BS_3$ into condition 0 in order to immediately suppress the dial tone. In fact, this suppression of this tone can be made automatically without an instruction from the register if receivers such as $REC_1$ and $REC_2$ are used cooperating with an oscillator at the subscriber's set working as described in U.S. Patent No. 3,164,680 (H. Adelaar et al.).

If $BS_1$ operates as soon as the dial is turned off-normal, bistable $BS_2$ operates by the dial pulse contact. These two bistables can be used to restore $BS_3$ into its 0 condition. The mere passage of $BS_1$ into condition 1 can send a trigger pulse towards the 0 input of bistable $BS_3$ as indicated in dotted lines by the connection involving condenser C. This trigger pulse will thus cause the suppression of the dial tone without the slightest delay.

When during various staticizing times the register will have obtained all the digits characterizing the called subscriber, it will be able, after having eventually obtained a translation of the directory number of the called subscriber into the corresponding equipment number, to determine the busy or idle state of the called line. The register will then establish a connection accordingly, either towards the called subscriber or towards a busy tone source.

Upon the receipt of all the digits identifying the called subscriber, the signalling path going through gates $G_1$, $G_{12}$, $G_{13}$ and $G_{14}$ may be interrupted under the control of the register which will cease to provide to the corresponding slave control equipment such as $SM_1$ for gate $G_1$, the identity of the gate to be unblocked during the time channel chosen for the connection.

It is of course understood that the signalling system between subscribers and voice frequency signalling units described above may also serve with necessary changes when the subscriber set is equipped with a push-button keyset for sending voice frequencies and particularly for the simultaneous emission of a combination of two frequencies to characterize a digit.

The signalling units may also be used in cooperation with the outgoing multiplex highways such as OJ or the incoming multiplex highways such as IJ depending on whether calls outgoing from the exchange or incoming calls are involved.

For an outgoing call, the digits of the called subscriber can be forwarded to unit SU in the manner described above. As soon as the register will have determined from e.g. the first two digits characterizing the prefix of the called subscriber's number that it concerns an outgoing call, the register will determine for the desired direction a free audio junction, e.g. that of which the outgoing audio circuit LCO is represented in FIG. 1. In parallel with this operation, the register will select another unit SU adapted to signalling between exchanges and comprising for instance a set of six tuned receivers and six oscillators working in accordance with the system of the Belgian Patent No. 586,689 (J. Martens).

Just as the register controls the selection of a channel which is simultaneously free on the multiplex highways such as $GH_1$, $IH_{15}$ and $SJ_1$ for sending the dial tone and receiving the digits coming from the calling subscriber, it will now select a time channel simultaneously free on the junctions $SJ_1$, $IH_{15}$ and OJ. Then, the register having knowledge of the identity of the signalling unit chosen for signalling with the distant exchange and possessing also the equipment number of the audio junction (LCO) will control the slave control equipments in order that these should establish a communication between SU and LCO by passing through the gates $G_{14}$, $G_{13}$, $G_{15}$ and $G_7$. The register can now control the sending of a signal on the junction connected to LCO and going towards the distant exchange. The register can have access to all the outgoing junction circuits of the audio junction such as that connected to LCO and cause the application of a D.C. signal at the outgoing end of the chosen junction, so that this calling signal can be detected at the distant exchange in the same manner as the loop closures are detected for the subscribers desiring to establish a communication. At the distant exchange, the detection of this signal will thus have for effect the selection of a free compartment of the multiple register, assuming that an exchange working in the same manner as the originating exchange is concerned.

The register at the distant exchange will thus be able to select an interoffice signalling unit in the same manner in the originating exchange and the distant exchange register will be able to supply a signal to this unit so as to activate two oscillators out of six which will send a particular combination of two frequencies towards the originating exchange to indicate that the distant exchange and in particular the seized signalling unit is ready to receive signals from the originating exchange. This activation of the oscillators may be performed by the triggering of two bistables such as $BS_3$.

So as to be able to send such a signal towards the originating exchange, the register at the distant exchange will first of all determine a channel simultaneously free between the signalling unit SU of the distant exchange and the incoming junction IJ. After this, the register will control the corresponding slave control equipments so as to establish a connection between the audio junction at the distant exchange and the signalling unit chosen at the distant exchange; i.e. on the figure this connection corresponds to a connection using gates $G_{11}$, $G_{16}$, $G_{13}$ and $G_{14}$. It is through this connection that the signalling unit SU at the distant exchange will send the proceed-to-send signal to the originating exchange and particularly to the signalling unit chosen in this office.

At the originating exchange, the register will have detected the proceed-to-send signal coming from the distant exchange. It will then order the unit SU at the originating exchange to transmit to the corresponding unit at the terminating exchange the last four digits of the called subscriber number with the help of combinations of two voice frequencies. The distant register can then store the number of the called subscriber connected to its exchange to determine if this called set is free or not. The result of this examination will then be transmitted by a combination of frequencies towards unit SU of the originating exchange in order to indicate the condition of the called subscriber. Having received this information, the register at the originating exchange can then release the engaged signalling unit and proceed to the establishment of the communication between the calling subscriber ($LC_1$) and the outgoing junction (LCO). Likewise, from the transmission of the called line condition, the register at the distance exchange can release the signalling unit engaged in this exchange and establish the connection at the distant exchange between the incoming junction (LCI) and the called subscriber ($LC_1$). If the called line is busy, the register at the distant exchange has no connection to establish while the register at the originating exchange will take care of applying busy tone to the calling subscriber.

It will be evident from the preceding description that the signalling units may be specialized in accordance with the functions which they must accomplish. A group of units may be solely an oscillator providing the dial tone. Upon a new call, a free unit out of this group will be selected by the register after it has determined from a class of line indicator that the calling line is of the ordinary dial type providing D.C. pulses. In this case it is obvious that these units may comprise only a single bistable $BS_3$ associated with this oscillator. This bistable $BS_3$ fulfills also the function of the busy bistable $BS_4$. Indeed, as soon as such a dial tone unit is selected by the register, the corresponding bistable can be triggered to indicate that the unit is seized and simultaneously put it in an operative state. In this case, as soon as the connection towards the calling subscriber is established by the slave control equipments serving the multiplex highways, the subscriber will receive the dial tone.

If the class of the calling subscriber indicates to the register that another type of set is concerned, the register can choose the signalling unit in a corresponding group. For example, the units are used as shown on the figure, in the case of a system operated in accordance with one of the manner described in U.S. Patent No. 3,164,680 (H. Adelaar et al.). A unit comprising a larger number of tuned receivers functions in accordance with another method indicated in this U.S. patent, or in accordance with the system of the U.S. Patent No. 3,140,358 (J. Martens).

Of course, signalling units adapted to work with different types of sets may also be considered, or even signalling units provided with a digit memory able to store signals such as the number of the called subscriber. This storage is used to retransmit the last four digits of the called subscriber to the distant exchange under the control of the originating exchange register, when this concerns an outgoing call.

It will also be noted that the signalling multiplex highways such as $SJ_{1/2}$ can be directly connected to the other multiplex highways such as $GH_{1/2}$, OJ and IJ without going through the intermediate multiplex highways $IH_{15}$ and $IH_{16}$. This amounts to saying that the gates such as $G_{14}$ would be directly connected to the highways such as $IH_{15/16}$. The shown system offers however the advantage of standardisation, as a connection between the calling subscriber and the signaling unit is established through three multiplex highways in cascade just as an ordinary communication between two subscribers, but also, for a given traffic with the signalling units, the probability of loss will be less with the arrangement shown. Indeed, for each signalling unit there are two signalling paths, i.e., either through the multiplex highway $IH_{15}$, or through the multiplex highway $IH_{16}$ and if a channel alignment is not possible by using one of these highways, there is a second chance to find it by means of other highway. This does not unduly complicate the search for an alignment since an attempt may be repeated if the first has failed, and only four additional gates such as $G_{13}$ are required in the interconnection circuit.

While the principles of the invention have been described above in connection with specific apparatus, it is to be clearly understood that this description is made only by way of example and not as a limitation on the scope of the invention.

We claim:

1. A signaling system for use in a time division multiplex telephone system comprising a plurality of multiplex highways, some of said highways being voice highways, and other of said highways being signal highways, means including a plurality of voice frequency generators for transmitting electrical signals, register means for controlling the operations of said system during intervals of an established time base according to desired switch paths, a plurality of gate circuits operated on a time base by said register to selectively interconnect any of said highways, means comprising said register for coupling at least one of said generators with at least one of said signal highways via at least one of said gate circuits, and means including other of said gate circuits for selectively coupling said signal highways into said voice highways.

2. The system of claim 1 and a plurality of signal receivers, at least one of said receivers being coupled to said one signal highway via said one gate circuit, whereby both said generator and said receiver are associated with the same signal highway via the same gate circuit.

3. The system of claim 2 wherein each of said signal highways individually couples to every one of said voice highways via said other gate circuits.

4. The system of claim 3 and a plurality of intermediate highways, said coupling of said signal highways to every one of said voice highways being over said intermediate highways via said other gates which are connected across the highway junctions.

5. The system of claim 4 and means responsive to calling conditions in said system for gating the output of said generator over said signal, intermediate, and voice highways as dial tone to a calling subscriber.

6. The system of claim 5 and dial means at a subscriber station for transmitting signals of the frequency received by said receivers, means associated with said dial for transmitting one frequency for dial off-normal conditions and a second frequency during each dial pulse, and means responsive to the receipt of said off-normal frequency at said receiver for terminating the transmission of said dial tone.

References Cited by the Examiner

UNITED STATES PATENTS

| | | | |
|---|---|---|---|
| 2,889,408 | 6/59 | Trousdale | 179—84 |
| 2,898,526 | 8/59 | Trousdale | 179—84 |
| 2,971,062 | 2/61 | Salihi | 179—84 |
| 3,033,935 | 5/62 | Melvin | 179—18 |
| 3,066,192 | 11/62 | Bartlett et al. | 179—18 |
| 3,070,665 | 12/62 | Faulkner et al. | 179—18 |
| 3,105,878 | 10/63 | Frankel et al. | 179—18 |

ROBERT H. ROSE, *Primary Examiner.*

WALTER L. LYNDE, *Examiner.*